US008191827B2

(12) United States Patent
Reynes

(10) Patent No.: US 8,191,827 B2
(45) Date of Patent: Jun. 5, 2012

(54) SYSTEM FOR MANEUVERING AN AIRCRAFT LANDING GEAR AND AIRCRAFT COMPRISING SAME

(75) Inventor: Didier Reynes, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 133 days.

(21) Appl. No.: 11/663,413

(22) PCT Filed: Sep. 15, 2005

(86) PCT No.: PCT/FR2005/050746
§ 371 (c)(1),
(2), (4) Date: Jun. 20, 2008

(87) PCT Pub. No.: WO2006/032811
PCT Pub. Date: Mar. 30, 2006

(65) Prior Publication Data
US 2008/0251637 A1  Oct. 16, 2008

(30) Foreign Application Priority Data

Sep. 21, 2004 (FR) .................................. 04 52105

(51) Int. Cl.
*B64C 25/00* (2006.01)
(52) U.S. Cl. ............ 244/100 R; 244/102 R; 244/102 A; 244/102 SL; 244/102 SS
(58) Field of Classification Search .............. 244/102 R, 244/102 A, 102 SL, 102 SS, 100 R
See application file for complete search history.

(56) References Cited

U.S. PATENT DOCUMENTS

| 2,452,787 A * | 11/1948 | Patch ........................ 244/102 R |
| 2,701,695 A * | 2/1955 | Irwin ........................ 244/102 R |
| 4,312,619 A * | 1/1982 | Anderson et al. ............. 414/347 |
| 4,573,649 A | 3/1986 | Yourkowski et al. |
| 5,484,120 A | 1/1996 | Blakeley et al. |
| 2002/0138158 A1* | 9/2002 | Landreth ......................... 700/21 |
| 2003/0164422 A1 | 9/2003 | Collet et al. |
| 2005/0082427 A1* | 4/2005 | Seung ....................... 244/102 R |

FOREIGN PATENT DOCUMENTS

FR    2 677 950 A    12/1992
JP       156889 A    10/1995

OTHER PUBLICATIONS

Office Action dated Mar. 7, 2008 for Chinese Application No. 2005800318418, 12 pages.

* cited by examiner

*Primary Examiner* — Tien Dinh
*Assistant Examiner* — Justin Benedik
(74) *Attorney, Agent, or Firm* — Patterson Thuente Christensen Pedersen, P.A.

(57) ABSTRACT

The invention concerns a system for maneuvering an aircraft landing gear mounted in a landing gear box closed by a set of hatches, comprising: a general control unit of the landing gear box to trigger the different maneuvers, a control channel for the hatches (16), a control channel for the landing gear (15), the general control unit, the hatch control channel and the landing gear control channel being controlled by an electric power source, when the aircraft is in normal operating conditions, emergency operating conditions and in maintenance phase. The invention also concerns an aircraft comprising such a system.

12 Claims, 4 Drawing Sheets

SYSTEM FOR MANEUVERING AN AIRCRAFT LANDING GEAR AND AIRCRAFT COMPRISING SAME

RELATED APPLICATIONS

This application claims priority to PCT Application No. PCT/FR2005/050746 filed Sep. 15, 2005, and French Application No. 0452105 filed Sep. 21, 2004 the disclosures of which are hereby incorporated by reference in their entirety.

FIELD OF THE INVENTION

The invention relates to a system for maneuvering an aircraft landing gear. A landing-gear operating system is a system used to extend and retract the landing gear relative to the fuselage of an aircraft. In many aircraft, the landing gear is retractable i.e. it is mounted so as to be hinged in a landing gear compartment situated within the fuselage of the aircraft. Thus, in cruising phase, the landing gear remains inside the fuselage, in the landing gear compartment, closed by a set of doors. Before the aircraft landing phase, the landing gear is extended or brought out of the gear compartment after the doors have been opened. The invention relates to the system to control the opening of the doors and the extension of the landing gear in normal operation, in emergency operation and in the maintenance phase.

The invention can be applied in aeronautics and especially in the field of the extension and/or retraction of the landing gear.

BACKGROUND ART

At present, most aircraft have one or more retractable landing gear units. Each landing gear, simply called a gear, is mounted in a housing of the fuselage called a "gear compartment". In cruising phase, the gear compartment is closed by a set of doors in order to maintain the aerodynamic profile of the aircraft. In the landing or takeoff phase, the gear is extended i.e. it is outside its housing in a position known as the lowered position. Before the aircraft landing phase, the gear comes out of its housing, i.e. it goes from a retracted position to a lowered position, normally in an automatic way, at the pilot's request.

In what is called "normal" operation, the gear unit exits or gets extended automatically from the gear compartment. In the event of a malfunctioning of the system, an emergency system ensures that the landing gear is extended automatically.

In normal operation, the landing gear can only be extended when the doors of the gear compartment have been opened. An operating sequence for the gear release system is therefore planned, wherein the doors are first of all opened and then the landing gear is lowered. A reverse sequence of operation is used to retract the gear into the gear compartment after the aircraft takes off.

In emergency operation, the landing gear exits the gear compartment by gravity, causing the doors to open. The doors of the gear compartment include one or more main doors and one or more secondary doors that are independent of the main doors. The main door is designed to be closed once the gear is in the lowered position. The secondary doors are designed to let through the landing gear strut; they therefore remain open so long as the gear is extended.

When the aircraft is on the ground, the main door of the gear compartment is closed, the secondary doors remaining open so as to leave only a minimum space for the gear strut. However, it may be necessary to open the main door for maintenance.

At present, the gear extension system is a combined system, i.e. it uses several energy sources. More specifically, in normal operation, the system uses hydraulic energy associated with electrical energy. In emergency operation, the system uses electrical energy associated with a mechanical kinematic chain. During maintenance, the system uses human energy associated with mechanical energy.

For normal operation, the system comprises the following elements:
  an electrically controlled valve or solenoid valve that connects the specific hydraulic circuit to the gear compartment with the general hydraulic circuit of the aircraft. This solenoid valve is controlled from the flight deck; it puts the hydraulic circuit of the gear compartment into operation.
  a hydraulic and electrical control channel for the door: this system comprises: at least one door-locking catch that keeps the door in a closed position,
    at least one door actuator that provides for the mobility of the door, and
    a door solenoid valve that controls the door actuator.

At present, the hydraulic and electrical door control channel is a hydraulic circuit called a door circuit. The door valve is the input point of this control channel. It is electrically controlled. When the valve is open, a fluid flows throughout the control channel, unlocking the door catch and feeding the door actuator, thus causing the door to open.

The system furthermore comprises a gear control channel comprising:
  at least one gear-holding catch that maintains the gear in retracted position,
  at least one gear actuator that provides for the mobility of the gear, and
  a gear solenoid valve that controls the gear actuator.

At present, the gear control channel is a hydraulic circuit called a gear circuit. The gear valve is the input point of this control channel. It is electrically controlled. When the valve is open, a fluid flows throughout the control channel, unlocking the gear-holding catch and feeding the gear actuator, thus causing the extension of the gear.

When the gear is in lowered position, the supply to the gear is cut off. The door actuator is then actuated to close the main door, the secondary doors remaining open so as to then leave only a minimum space for the passage of the gear strut. Once the main door is closed, the supply to the door actuator is cut off to prevent any untimely opening of said door. The hydraulic circuits specific to the gear compartment are then disconnected from the general hydraulic circuit.

The opening of the door and then the extension of the gear are obtained by means of a hydraulic circuit sequentially controlled by an electronic computer. Thus, the fact of having one solenoid valve for the doors and another solenoid valve for the gear makes it possible to open these valves at different instants, more or less spaced out in time, thus providing for a sequencing in the opening of the doors and the extension of the gear.

The sequencing of the raising of the gear into the gear compartment is the reverse of the sequencing of the gear extension. It comprises the same steps as those of the gear extension and is controlled electrically and hydraulically, but performed in reverse order.

Thus, in normal operation, the general control valve and the valves of the gear and door hydraulic circuit are electrically controlled from the flight deck, for example by the onboard computer for the aircraft landing gear, upon a command from the pilot.

In the event of a malfunctioning of the general hydraulic circuit or of the hydraulic circuit specific to the gear compartment, an emergency operation is planned. This emergency operation, known as gear free-fall is obtained by means of a specific system shown in FIG. 1. It shows the emergency system installed in the gear compartment.

FIG. 1 is a schematic view of a gear compartment in which a classic emergency system is: mounted. This system has an actuator 1 electrically controlled, for example, by the landing gear computer. This actuator 1 is mechanically connected by a kinematic chain 2 (also called a linkage) with the door catch 3, the gear catch 7 and a valve 4. This figure shows a more detailed view of the door control channel 6 with its locking hook 3 and the gear control channel 5 with its holding catch 7. The valve 4 enables the pistons to slide freely in the actuators for the door and the gear.

In this emergency operation, the sequencing of the door and gear catch unlocking operations is done mechanically by the implementation of the actuator 1.

It will be understood of course that in this mode of emergency operation, the doors remain open and, the landing gear cannot be retracted.

In another mode of operation of the gear extension system, especially when the aircraft is on the ground it is important for reasons of maintenance to be able to open the main door of the gear compartment manually. For, when the aircraft is on the ground and when it is resting on its landing gear, this door is closed. The maintenance staff should be able to enter the landing gear compartment for inspection. On the ground, the hydraulic energy is not available because the engines are turned off. The door is then opened mechanically using a mechanical grip situated close to the door. FIG. 2 shows one example of a classic maintenance system of this kind. It provides a schematic view of the maintenance system as fixed in the landing gear compartment.

The maintenance system comprises a mechanical grip 8 connected by a kinematic chain 9 (also called a linkage) to the door control channel 6. The kinematic chain 9 may be a ball control unit fixed by guides to the wall of the landing gear compartment. The actuation of the grip 8 causes the kinematic chain 9 to be driven in motion, actuating the opening of the main door. More specifically, when the grip 8 is rotated, example by an angle of 90°, the kinematic chain 9 is driven in a linear motion which achieves the following sequencing:

the isolation of the specific hydraulic circuit for supplying the door actuators (for the sake of safety, in order to prevent an accidental connection of the general hydraulic circuit from causing an untimely closing of the main door);

the opening of the valve 10 enabling the free circulation of fluid in the chamber of the door actuator so that the actuator does not counter the opening of said door;

the mechanical unlocking of the main door catch.

The main door then opens by gravity or by a manual operation.

In the maintenance system, the manual grip is fixed to the fuselage of the aircraft, generally in a closed cavity, made in the vicinity of the door. The consequence of this is that it is placed at a relatively great height from the ground. Consequently, the maintenance staff in certain cases have to climb a ladder to be able to grasp this grip and actuate it in order to open the door.

Moreover, as just explained, the architecture for controlling the extension and retraction of the landing gear is complex and requires a large number of bulky elements, such as the kinematic chains which differ according to the mode of operation.

Furthermore, so that they may capable of being used in the different modes of operation, certain elements are controllable by different energy sources and this makes them more complex. For example, the gear catch has two independent inputs: one hydraulic input for normal operation and one mechanical input for emergency operation. Similarly, the door catch has three separate, independent inputs: one hydraulic input in normal operation, one mechanical input in emergency mode and one special mechanical input for maintenance. This leads to substantial requirements of space for the interfaces with the control channels.

Furthermore, the door and gear catches are situated in non-pressurized compartments while the control channels are situated mainly in pressurized compartments. Consequently, all manner of precautions must be taken to enable this linkage to go through the walls of the pressurized compartments without affecting the pressure in these compartments.

At present, aircraft manufacturers are seeking to design aircraft to transport ever bulkier and heavier loads in a single flight. To this end, they are seeking to design ever larger aircraft. Such aircraft may have a greater number of landing gear than classic aircraft. This greatly increases the above-stated problems for landing gear. Furthermore, this increase in the number of landing gear units considerably increases the mass of the aircraft.

Furthermore, in these large-sized aircraft, the wheels of the landing gear may be bulkier than the wheels of classic landing gear. This means that the fuselage is at a higher position relative to ground. For reasons of mass and positioning, the grip must be placed in a non-pressurized zone which requires that an orifice be made for the passage of the linkage into a pressurized wall with all the pressurization-related problems that this may entail. This grip would then be positioned at a great distance from the ground, at a height greater than man-size height, with increased risks of falling for maintenance crew.

SUMMARY OF THE INVENTION

The invention is aimed precisely at overcoming the drawbacks of the above-mentioned techniques. To this end, the invention proposes a system for maneuvering the landing gear of an aircraft wherein the door-opening control and the gear-extension control are achieved electrically, whatever the mode of operation. For, electrical power is always available on board an aircraft, either because of the working of the jet engines in normal operation or if there is a loss of hydraulic energy, or through a back-up propeller used to generate a quantity of electricity that is sufficient to maneuver the aircraft in downgraded mode (with loss of hydraulic and electrical energy) or, if necessary, through the use of an auxiliary energy source on the ground (batteries, ground power units, etc.), in the maintenance phase. The invention therefore proposes to replace the hydraulic and mechanical controls of the door control channels and gear control channels by electrical controls in normal operation, emergency operation and maintenance operation.

More specifically, the invention relates to a system for maneuvering a landing gear of an aircraft mounted so as to be hinged in a gear compartment closed by a set of doors, comprising:

a general control unit of the gear compartment to trigger the different maneuvers, a door control channel, a landing-gear control channel, characterized in that the general control unit, the door control channel and the gear control channel are controlled by an electrical energy source when the aircraft is in normal operation, in emergency operation and in a maintenance phase.

The invention may also comprise one or more of the following characteristics:

- the door control channel comprises at least one electrically controlled door-locking device, at least one door-actuation unit and one electrically controlled unit to control the actuation unit.
- the gear control channel comprises at least one electrically controlled landing-gear holding device, at least one gear actuation unit and one electrically controlled unit to control the actuation unit.
- in normal operation, the energy source is the available general electrical power supply of the aircraft.
- in emergency operation, the power source is the general electrical supply of the aircraft or a secondary electrical source of the aircraft, comprising a propeller if the general electrical supply of the aircraft is not available.
- in the maintenance phase, the energy source is an available electrical source of the aircraft or an auxiliary electrical source on the ground.
- the door control channel comprises at least one electrical actuating mechanism associated with the door-locking device and one electrical actuating mechanism associated with the control unit for the door actuation unit.
- the gear control channel comprises at least one electrical actuating mechanism associated with the gear-holding device and one electrical actuating mechanism associated with the control unit for the gear actuating unit.
- the door control channel comprises an electrical control unit activating the opening of the main door in maintenance phase.
- the general control unit is electrically connected to the door control channel and to the gear control channel.
- the electrical link between the general control unit and the door control and gear control channels is a wire link.
- the general control unit provides for a sequencing in the actuation of the door-locking and gear-holding device and in the actuation units.

The invention also concerns an aircraft provided with this landing gear maneuvering system.

DETAILED DESCRIPTION OF EMBODIMENTS OF THE INVENTION

Figure 1:
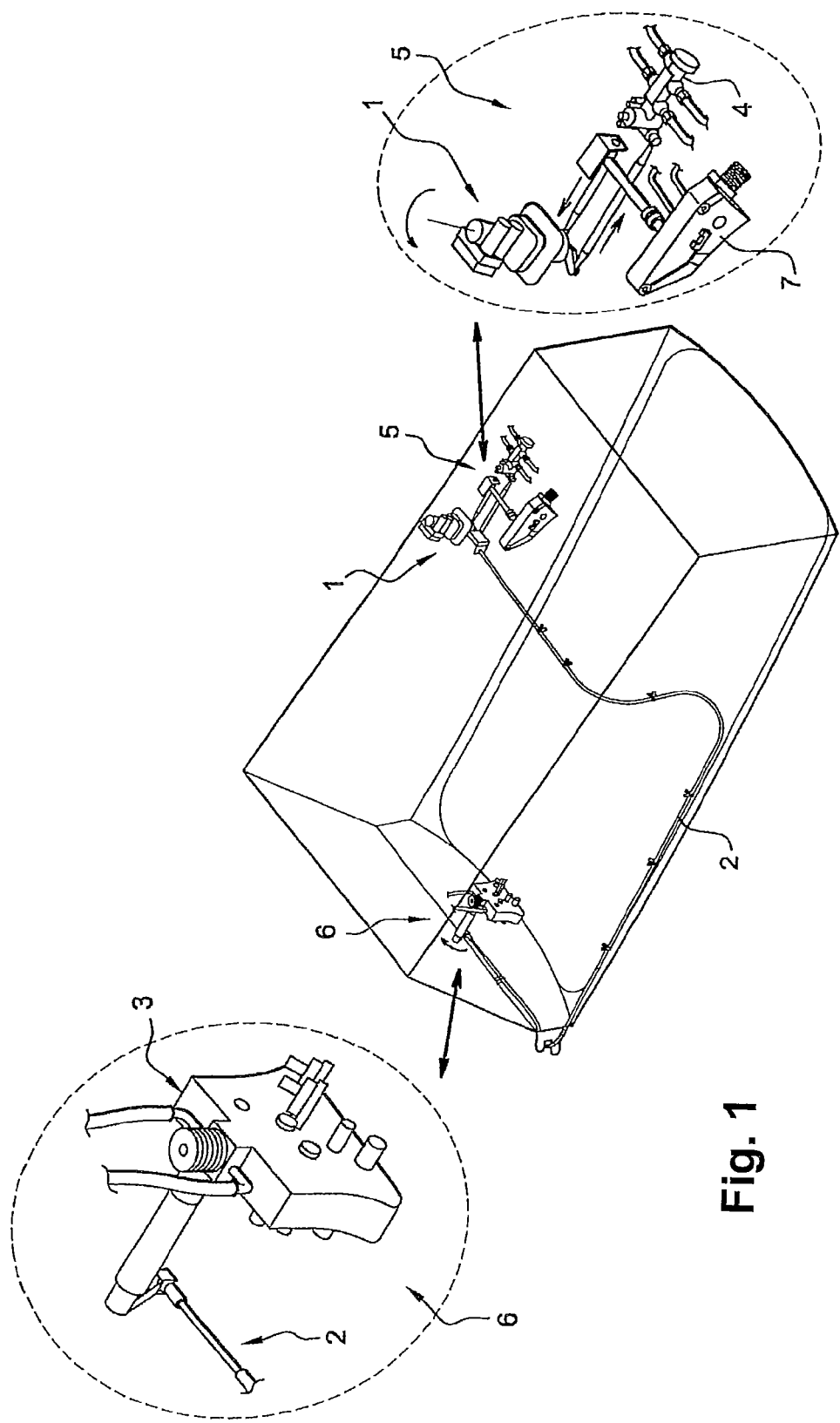
FIG. 1, already described, depicts the prior art landing gear extension system in emergency operation.
Figure 2:
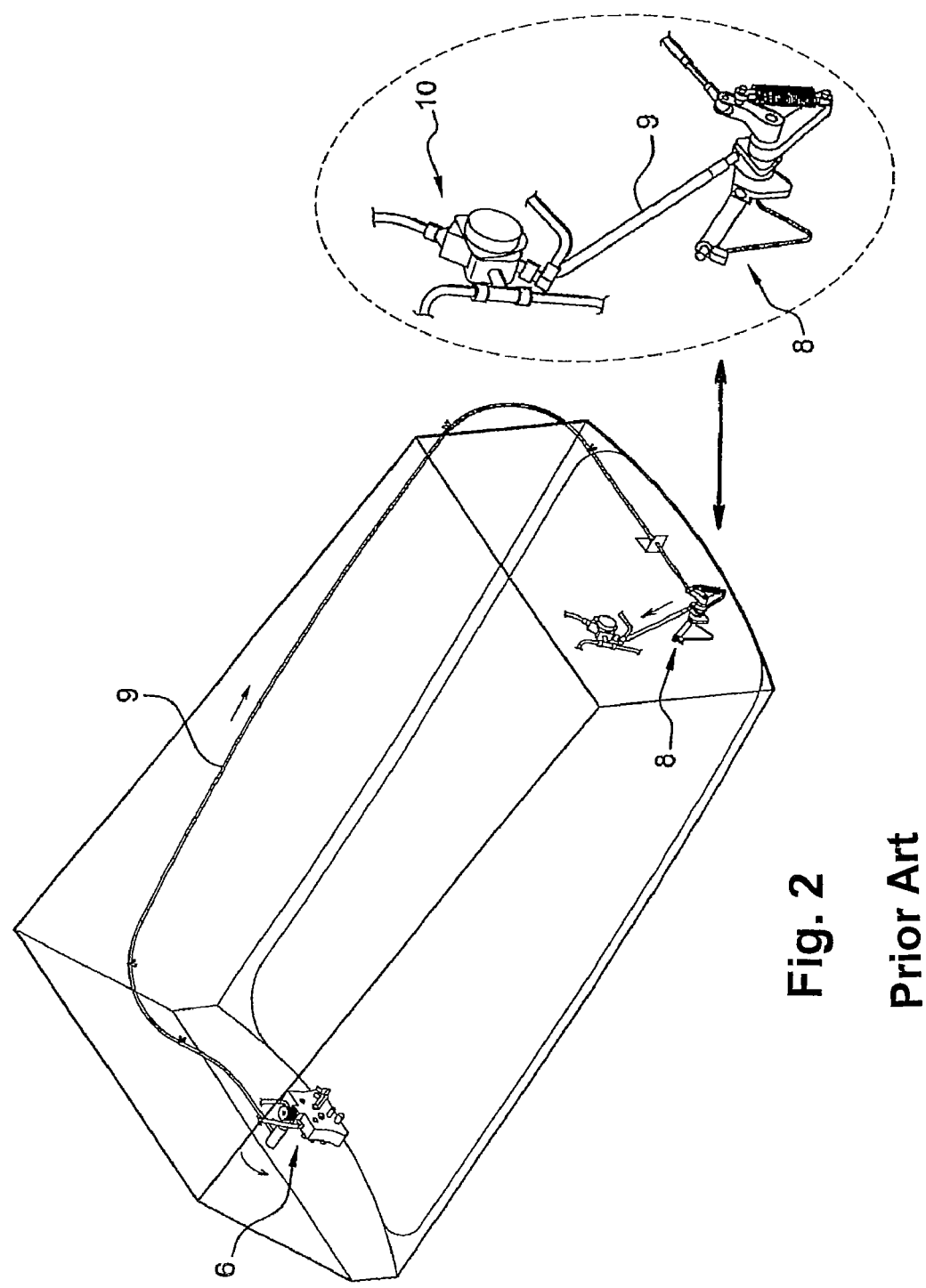
FIG. 2, already described, depicts the prior art landing gear extension system in maintenance phase.
Figure 3:
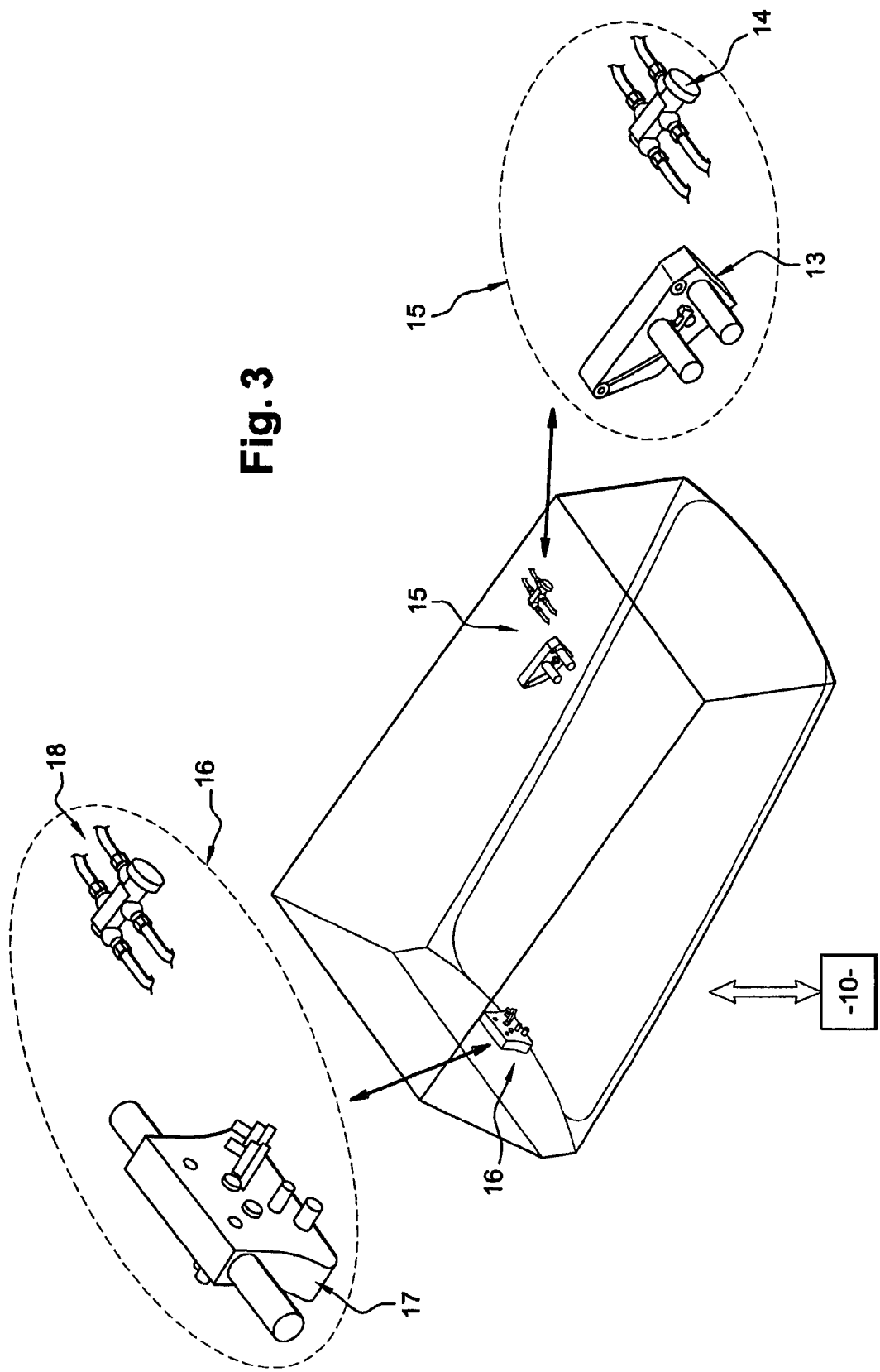
FIG. 3 depicts the landing gear extension system according to an embodiment of the invention.
Figure 4:
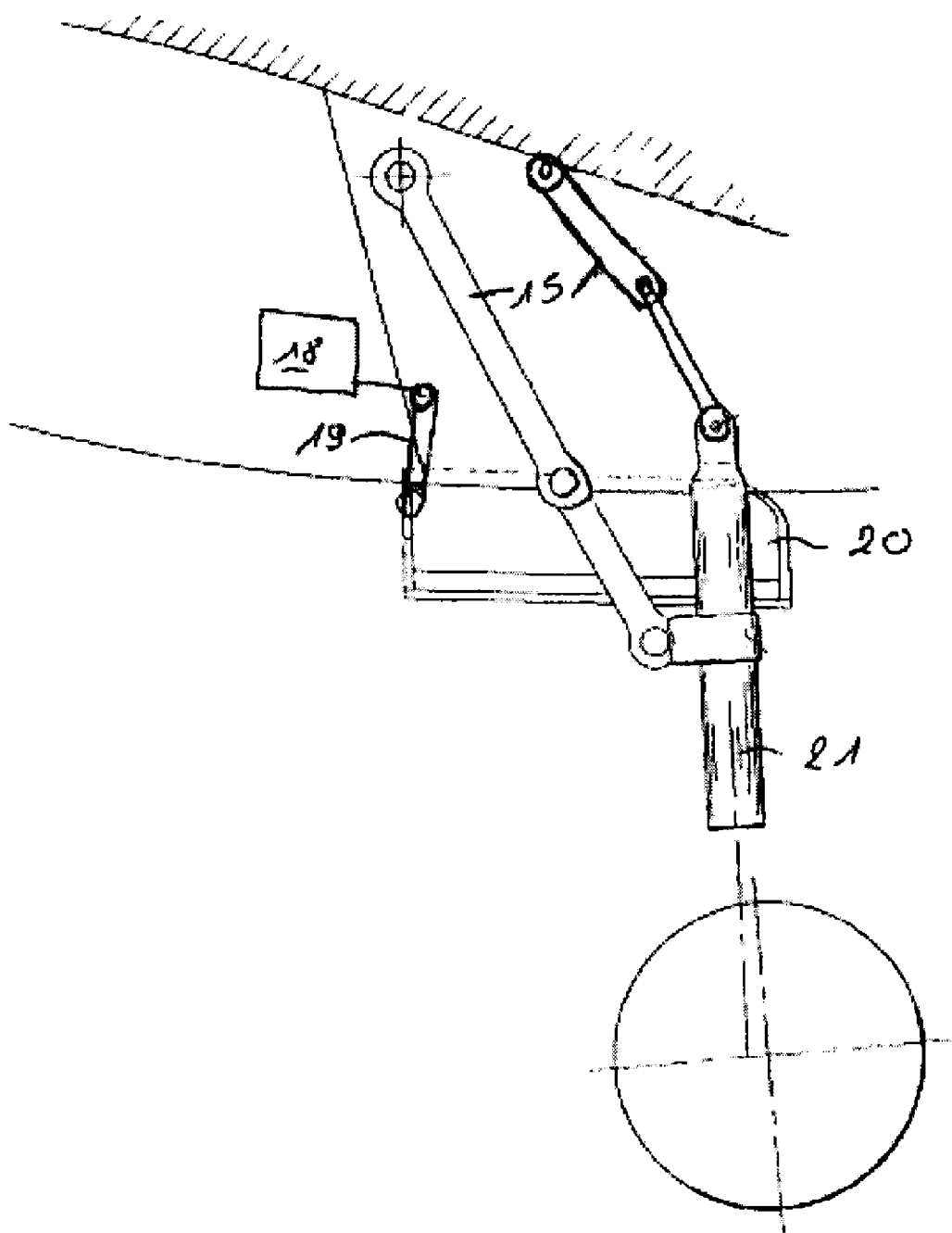
FIG. 4 represents the landing gear extension system according to the invention.

The invention proposes an electrically controlled landing gear maneuvering system. This system of the invention is shown in FIGS. 3 and 4.

A maneuvering system in accordance with the invention has a door control channel 16 and a gear control channel 15. These channels are themselves controlled by a general control unit.

The door control channel 16 has at least one locking device for each door, at least one actuating unit for each door and one control unit for this actuating unit. As explained here above, the gear compartment of an aircraft has several doors, namely one or more main doors and at least one secondary door. The invention shall be described in its application to a main landing-gear door. It must be noted that it can also be applied to all of the main doors of an aircraft (should the aircraft have several main doors) and one or more secondary doors of the aircraft, it being understood that, in this case, the secondary door will remain open so long as the landing gear is extended.

Each door is actuated by means of at least one actuating element such as a actuator or an electrical motor. Here below in the description, the actuating unit will be considered to be an actuator. The actuators are controlled by means of a control unit 18. This control unit may be a solenoid valve, namely a hydraulic valve electrically controlled by an electrical motor.

Each door has held in a locked position by means of a locking device 17. This locking device may be a catch or else a self-locking actuator or again a system of rods connected to the gear and making it possible, through an appropriate kinematic system, for the door to be opened when the landing gear begins its extension phase. Here below in the description, it will be assumed that the locking device is an electrically controlled catch. The locking device therefore, in the invention, is associated with an electrical actuating mechanism.

In FIG. 4, a system for maneuvering a landing gear 21 of an aircraft mounted so as to be hinged in a gear compartment closed by a set of doors 20 is depicted. The system comprises a general control unit of the gear compartment to trigger the different maneuvers, a door control channel 16, and a landing-gear control channel 15, wherein the general control unit, the door control channel 16 and the gear control channel 15 are controlled by an electrical energy source when the aircraft is in normal operation, in emergency operation and in a maintenance phase. The door control channel 16 comprises at least one electrically controlled door-locking device 17, at least one door-actuation unit 19 and an electrically controlled unit 18 to control the actuation unit 19.

In other words, in a preferred embodiment of the invention, the door control channel comprises:

- a locking catch electrically controlled from an electrical actuating mechanism, and
- a door actuator hydraulically controlled by a solenoid valve.

The gear control channel 15 comprises a gear-holding device, at least one gear-actuating unit and at least one unit for controlling this actuating unit. The gear is therefore actuated by means of an actuating unit such as a actuator or an electrical motor. Here below, it will be assumed that the actuating unit is a actuator. This actuator is controlled by means of a solenoid valve type control unit 14.

In the retracted position, the gear is held by a holding device 13 which may be a catch or a self-locking actuator. Here below in the description, it will be assumed that the holding device is an electrically controlled catch. In the invention, the holding catch is associated with an electrical actuating mechanism.

Thus, in a preferred embodiment of the invention, the gear control channel comprises:

- a gear holding catch electrically controlled from an electrical actuating mechanism, and
- a gear actuator hydraulically controlled by a solenoid valve.

The gear control channel, like the door control channel, is controlled electrically from a general control unit situated, for example, on the flight deck. The different elements of these gear and door control channels, namely the actuators and catches, then operate in a classic way, i.e. they operate hydraulically and/or mechanically. The control of these elements is entirely electrical. In other words, each unit of the gear control channel and door control channel can receive an electrical control command sent out by the general control unit. To this end, each unit is connected to an electrical actuating mechanism, namely an electrical motor or a solenoid valve.

In flight, the electrical current on board an aircraft is provided for example by the jet engines of the aircraft. Thus, in normal operation, the electrical current needed for the maneuvering of the landing gear, and therefore the doors, may be given by the jet engines of the aircraft, like all of the on-board electrical power.

In the event of malfunctioning of the normal hydraulic system in the aircraft, a downgraded mode known as emergency operating mode is set up. In this downgraded mode, the electric power needed for maneuvering the landing gear and the doors is given by an available energy source of the aircraft.

On the ground, in the maintenance phase, the electrical energy may be given by an auxiliary energy source. This auxiliary energy source may be, for example, the batteries of the aircraft or a power generator on the ground.

It will be understood therefore that, a single system for maneuvering the landing gear and the doors may be implemented in normal operation as well as in emergency operation or in a maintenance phase. In the invention, whatever the mode of operation (normal, emergency or maintenance modes), the only source of energy for the door and gear control channels is electrical energy. There is therefore no longer any mechanical channel or hydraulic channel specific to each mode of operation. In the invention, the door control channel and the gear control channel are each connected solely by an electrical link to the general control unit. This electrical link may be an electrical cable or else even a wireless link.

It will easily be understood that it is simpler to make an electrical cable pass into the landing gear compartment than to install a linkage which is bulkier, less flexible and more difficult to install and moreover induces stresses at the fastening points.

The maneuvering of the landing gear and of the doors is therefore controlled in flight by the crew using the onboard computer from the flight deck, through the actuation of a switch, a handle connected to an electrical position sensor or any other electrically controlled unit. This electrical control unit transmits the door-opening and gear-extension command according to a predetermined sequence which ensures that the doors are opened before the landing gear is extended, and then that the door is closed once the landing gear is extended. In reverse, during the retraction of the landing gear, this predetermined sequence ensures the opening of the main door before the raising of the landing gear and then, the closing of the main and secondary doors once the landing gear has been retracted. The succession of door opening/closing maneuvers and landing gear extension/retraction maneuvers is obtained through the sequencing of the control commands sent by the general control unit.

In the maintenance phase, the opening of the main door can be controlled by an electrically controlled unit 10 placed so that it is easily accessible. This electrical control unit 10, which is a switch or control lever type, controls the opening of the main door of the landing gear compartment. This switch may take the form of an electrical button connected by an electrical cable to the door control channel 16. In FIG. 3, the connection between the switch 10 and the door control channel 16 is symbolized by a two-headed arrow. The advantage of an electrical switch of this kind is that it can be placed within reach. Indeed, since this electrical switch is less bulky than a manual grip, it can be installed directly on the fuselage or even on the landing gear. There is no risk that it might modify the lift of the aircraft and it can therefore be installed elsewhere than in an enclosed cavity. It may for example be installed on a strut of the landing gear.

The system of the invention therefore enables an improvement with regard to mass as well as an improvement in space since there is no shaft, rod or other mechanical linkage going through the housing of the landing gear.

The invention claimed is:

1. A system for maneuvering a landing gear of an aircraft mounted so as to be hinged in a gear compartment closed by a set of doors, comprising:
   a general control unit of the gear compartment to trigger the different maneuvers;
   a door control channel;
   a landing-gear control channel; and
   a single commonly shared system for controlling the landing gear and the set of doors, the single commonly shared system configured to be implemented in each of a normal operation, an emergency operation and a maintenance phase of the aircraft, the single commonly shared system comprising the general control unit, the door control channel and the landing-gear control channel such that the single commonly shared system is controlled by a single source of electrical energy in each of the normal operation, the emergency operation and the maintenance phase,
   and wherein the door control channel and the gear control channel being each connected to the general control unit solely by an electrical link and being capable of receiving control commands sent by the general control unit according to a predetermined sequencing.

2. A system according to claim 1, wherein the door control channel comprises at least one electrically controlled door-locking device, at least one door-actuation unit and one electrically controlled unit to control the actuation unit.

3. A system according to claim 2, wherein the door control channel comprises at least one electrical actuating mechanism associated with the door-locking device and one electrical actuating mechanism associated with the control unit for the door actuation unit.

4. A system according to claim 2, wherein the door control channel comprises an electrical control unit placed outside the aircraft, activating the opening of the main door in maintenance phase.

5. A system according to claim 1, wherein the gear control channel comprises at least one electrically controlled landing-gear holding device, at least one gear actuation unit and one electrically controlled unit to control the actuation unit.

6. A system according to claim 5, wherein the gear control channel comprises at least one electrical actuating mechanism associated with the gear-holding device and one electrical actuating mechanism associated with the control unit for the gear actuating unit.

7. A system according to claim 1 wherein, in normal operation, the source of energy is an available general electrical power supply of the aircraft.

8. A system according to claim 1 wherein, in emergency operation, the source of energy is a general electrical supply of the aircraft or a secondary electrical source of the aircraft, comprising a propeller.

9. A system according to claim 1 wherein, in the maintenance phase, the source of energy is an available electrical source of the aircraft or an auxiliary electrical source on the ground.

10. A system according to claim 1, wherein the electrical link between the general control unit and the door control and gear control channels is a wire link.

11. A system according to claim 1, wherein the general control unit provides for a sequencing in the actuation of the door-locking and gear-holding device and in the actuation units.

12. An aircraft comprising a retractable landing gear, comprising a system for maneuvering the landing gear according to claim 1.

* * * * *